Nov. 13, 1923.
H. L. SMITH
WOOD SCREW MACHINE
Filed Jan. 3, 1922
1,474,177
2 Sheets-Sheet 1
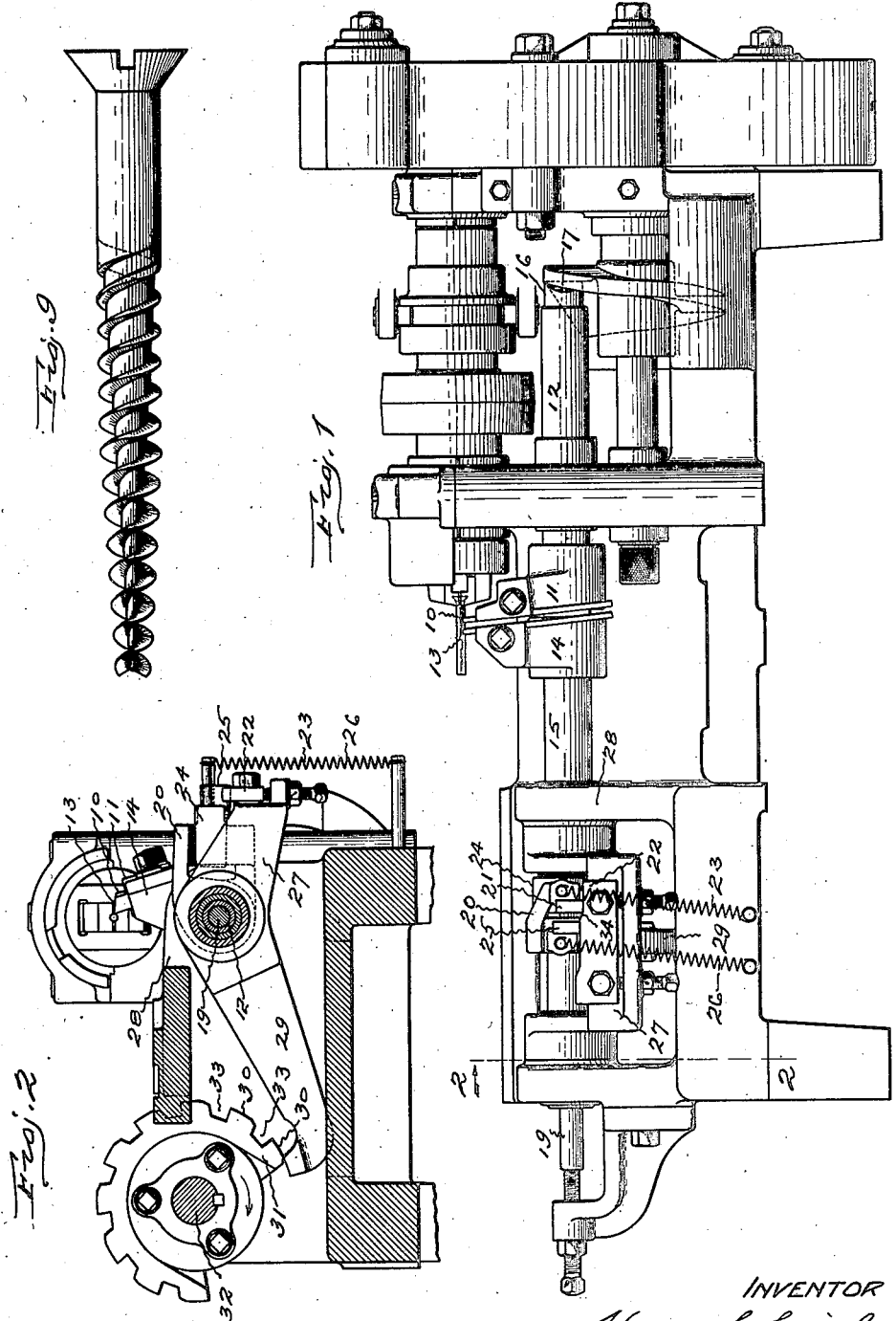
INVENTOR
Henry L. Smith by
Harry R. Williams
ATTORNEY

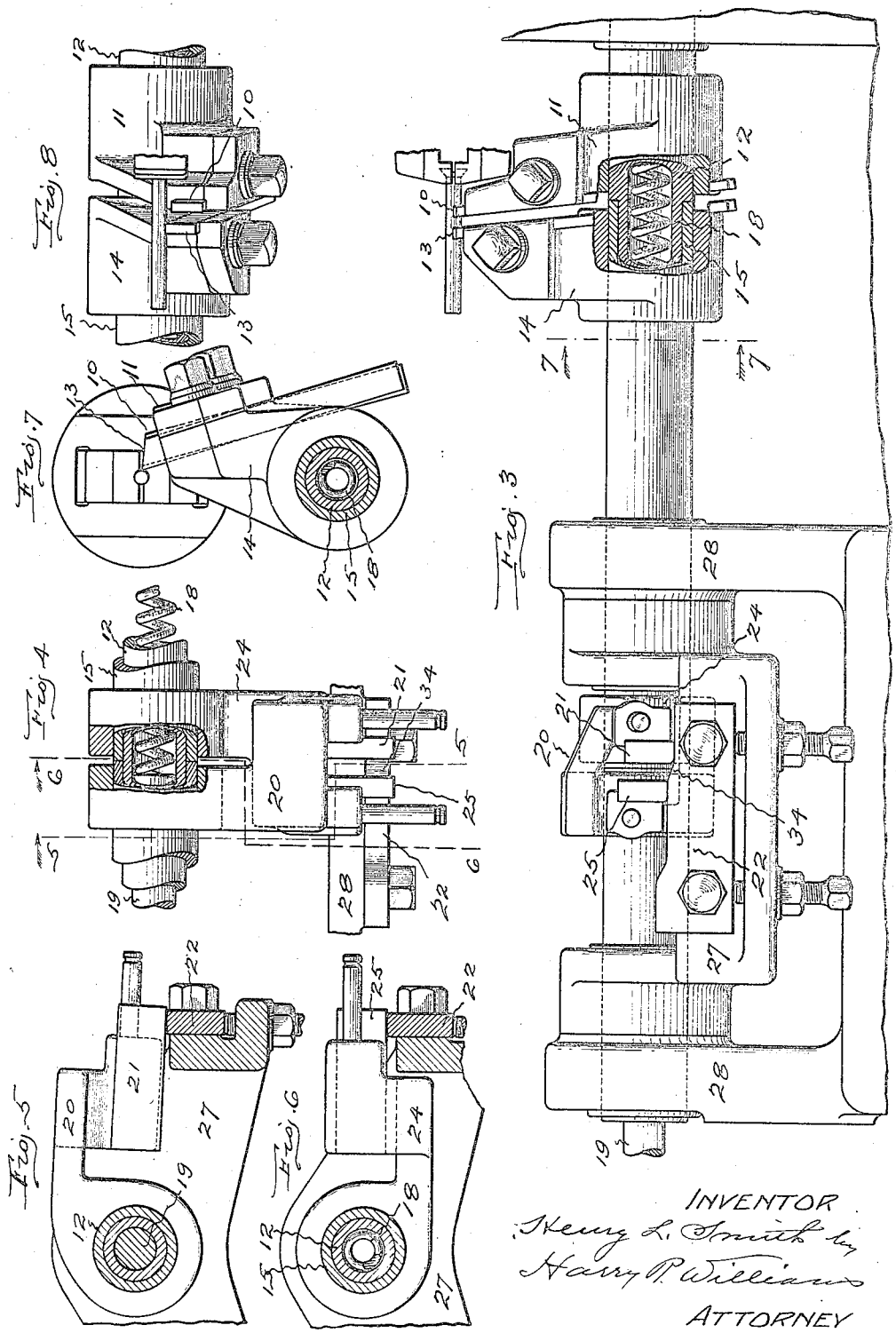

Patented Nov. 13, 1923.

1,474,177

UNITED STATES PATENT OFFICE.

HENRY L. SMITH, OF WATERBURY, CONNECTICUT, ASSIGNOR TO THE E. J. MANVILLE MACHINE COMPANY, OF WATERBURY, CONNECTICUT, A CORPORATION OF CONNECTICUT.

WOOD-SCREW MACHINE.

Application filed January 3, 1922. Serial No. 526,493.

*To all whom it may concern:*

Be it known that I, HENRY L. SMITH, a citizen of the United States, residing at Waterbury, in the county of New Haven and State of Connecticut, have invented a new and useful Improvement in Wood-Screw Machines, of which the following is a specification.

This invention relates to those machines that are designed to cut a plurality of threads on screw blanks, in which two cutting tools are employed. In automatic wood screw machines the thread cutting tools are fed and returned several times along each blank. At the end of each feed the tools are turned out from the blank so that they may be returned for the next cut without interference. After each return the cutting edges of the tools are carried in slightly further toward the axis of the blank than during the previous forward feed so as to increase the depth of the cuts. The feed and return movements are controlled by a feed cam, the depth of the cuts is controlled by a depth cam, and the contour of the cuts is controlled by a profile cam.

The object of the present invention is to so design the tool controlling mechanisms of a machine of this class in which there are two threading tools on the same side of the blank that while both tools are actuated by the same feed, depth and profile cams the threads cut will start on diametrically opposite sides of the blank at the same distance from the point.

To accomplish this with two tools arranged side by side on the same side of the blank and fed and returned, and turned in and out toward the axis varying distances by the same actuating mechanisms, it is necessary to temporarily hold the following tool away from the blank so as to prevent it from cutting until that tool has fed longitudinally of the blank such a distance that when it is turned in to cut it will start cutting on the opposite side of the blank from where the advance tool commenced but at the same distance from the point of the blank that the advance tool started cutting.

In the present embodiment of the invention the two tools are actuated by a common feed cam, depth cam and profile cam, the tools being mounted on independent concentric feed shafts each of which shafts is provided with its own arm and shoe for engaging the profile cam that is so cut that the following tool is not turned in to cut until it has reached the locality where the advance tool commenced to cut.

In the accompanying drawings Figure 1 shows a front elevation of so much of a wood screw machine as is necessary to an understanding of the present invention. Fig. 2 shows a vertical section of the mechanism taken on the plane indicated by the dotted line 2—2 on Fig. 1. Fig. 3 shows on larger scale the cutting tools, feed shafts they are mounted on and the profile cam which is shaped so that the following tool will not commence to cut until it is fed to the position in which the advance tool commenced to cut. Fig. 4 shows a plan of the arms which project from the feed shafts and bear the shoes which rest upon the profile cam. Fig. 5 is a section on the dotted line 5—5 on Fig. 4. Fig. 6 is a section on the dotted line 6—6 on Fig. 4. Fig. 7 is a section taken on the plane indicated by the dotted line 7—7 on Fig. 3 showing a side elevation of the tool holders and tools. Fig. 8 shows a plan of the holders and tools, Fig. 9 shows on larger scale a screw which has been threaded by means embodying this invention.

In the machine illustrated the following tool 10 is clamped in a holder 11 that is fastened to a tubular shaft 12. The advance tool 13 is clamped in a holder 14 that is fastened to a tubular shaft 15 which is fitted upon the shaft 12 so that the two shafts may be rotated independently but will move longitudinally as one. One end of the shaft 12 has a shoe 16 that is held in engagement with the feed cam 17 of common outline which is rotated by the usual mechanism. In the interior of the shaft 12 is a spiral spring 18 which is arranged to thrust between the shaft at a point near the feed cam and an adjustable rod 19 that projects into the other end of the shaft. The pressure of this spring holds the shaft yieldingly against the feed cam.

Adjustably fastened to the shaft 12 which carries the following tool is a rocker arm 20 that at its forward end has a shoe 21 which is held in engagement with the edge of the profile cam 22 by a spring 23. Adjustably fastened to the shaft 15 which carries the advance tool is a rocker arm 24 that at its forward end has a shoe 25 which is held in engagement with the edge of the profile cam by a spring 26. Through these parts the tools are turned in and out toward and from the screw blank independently by the common profile cam as the shaft is fed and returned by the feed cam. The rocker arm 20 crosses the rocker arm 24 and the latter crosses under the former so that the shoe 25 that is on the arm 24 which is fastened to the shaft 15 that carries the advance tool, will rest on the profile cam in advance of the shoe 21 which is on the arm 20 that is fastened to the shaft 12 which carries the following tool. In other words the shoes rest upon the profile cam in the same relation to the direction of feed and return as the tools which they control.

The profile cam is adjustably fastened to the front of a yoke-shaped saddle 27 which is pivotally mounted in the frame 28 concentric with the shafts 12 and 15. Projecting rearwardly from the saddle is a lever 29 the end of which is successively engaged by the surfaces 30 of the cut cam 31 that is mounted on the cam shaft 32. The cut cam illustrated is of the type described in the United States Patent No. 1,196,308 granted on my application August 29, 1916. When the end of the lever is engaged by one of the cam surfaces the saddle is turned so as to rock the feed shaft and turn the tools in toward the screw blank. The parts are so timed that the end of the lever drops into one of the spaces 33 when the return movement of the tools is being affected allowing the tools to be drawn away from the screw blank. Each succeeding projection of the cam is higher than the preceding projection in order that a deeper cut shall be made by the tool after each return movement as set forth in the above mentioned patent. The cam shaft and feed cam illustrated may be driven by mechanism similar to that described in United States Patent No. 1,170,694 granted on my application February 8, 1916.

The profile cam has an extra drop 34 beyond the point where it controls the advance tool. This drop is so located and the shoes and tools are so adjusted with relation to each other that as the tools are fed the following tool is swung up to engage the blank by the profile cam until it reaches during its feed lengthwise of the blank, the locality where the advance tool was engaged with the blank and one-half turn of the blank later. By this means while one tool follows the other and both are fed by the same feed cam and controlled by the same profile cam and cut cam, the following tool does not begin its cut until it is the same distance from the point and diametrically opposite from where the advance tool began to cut the blank, and as a result a screw blank is provided with two threads, each of which starts the same distance from the point, as shown in Fig. 9.

The invention claimed is:

1. A screw machine having a plurality of threading tools arranged fractions of full pitch apart and mounted to move together longitudinally of the blank to be threaded but move independently transversely of the blank, common means for feeding the tools together longitudinally along and beyond the point of the blank, and common means for feeding the tools independently transversely of the blank, said latter means containing a part which acts to feed the advance tool transversely before feeding the following tool transversely, whereby the tools begin to cut at the same distance from the point of the blank but each cuts a separate thread.

2. A screw machine having a plurality of threading tools arranged side by side fractions of full pitch apart on the same side of the blank to be threaded, said tools being mounted to move together longitudinally of the blank but move independently transversely of the blank, means for feeding the tool longitudinally along and beyond the point of the blank and means for feeding the tools transversely of the blank, said latter means feeding the advance tool transversely of the blank before feeding the following tool transversely of the blank.

3. A screw machine having a plurality of threading tools arranged side by side fractions of full pitch apart on the same side of the blank to be threaded, said tools being mounted to move together longitudinally of the blank but oscillate independently transversely of the blank, means for feeding the tools together longitudinally along and beyond the point of the blank and means for oscillating the advance tool transversely of the blank before oscillating the following tool transversely of the blank, whereby the tools begin to cut at the same distance from the point of the blank.

4. A screw machine having a plurality of threading tools arranged side by side fractions of full pitch apart on the same side of the blank to be threaded, means for feeding the cutting tools, longitudinally along and beyond the point of the blank, equal distances, and means for feeding the tools transversely into the blank equal distances but one before the other, whereby each tool cuts a separate thread but the following tool does not begin to cut as soon as the advance tool.

5. A screw machine having a plurality of threading tools arranged side by side fractions of full pitch apart on the same side of the blank to be threaded, means for feeding the cutting tools, longitudinally along and beyond the point of the blank, equal distances, and common means for feeding the tools together transversely of the blank unequal distances, whereby each tool cuts a separate thread but the following tool does not begin to cut as soon as the advance tool.

6. A screw machine having a plurality of threading tools arranged side by side fractions of full pitch apart on the same side of the blank to be threaded, common means for feeding the cutting tools together longitudinally along and beyond the point of the blank, and means for feeding the tools together transversely of the blank unequal distances, whereby each tool cuts its own thread but the following tool does not commence to cut as soon as the advance tool.

7. A screw machine having a plurality of threading tools arranged side by side fractions of full pitch apart on the same side of the blank to be threaded, a common cam for feeding both tools longitudinally along and beyond the point of the blank, a common cam for determining the depth of cut of the tools, and a common cam for determining the profile of the cuts, said profile cam being shaped so that the following tool is not brought into engagement with the blank until during its feed it has reached the locality at which the advance tool began to cut.

8. A screw machine having a plurality of threading tools arranged side by side fractions of full pitch apart on the same side of the blank to be threaded, a common cam for feeding both tools longitudinally along and beyond the point of the blank, a common cam for determining the depth of cut of the tools, and a common cam for determining the profile of the cuts, said profile cam having a cut down section that is engaged by the following tool but not by the advance tool, whereby the following tool is not brought into engagement with the blank until after the advance tool has begun to cut.

9. A screw machine having a plurality of threading tools arranged side by side fractions of full pitch apart on the same side of the blank to be threaded, a common feed cam for feeding both tools longitudinally along and beyond the point of the blank, a common spring for returning both tools together, a common cut cam for determining the depth of the cut of the tools. and a common profile cam controlled by the cut cam for moving the tools toward and from the blank, said profile cam being so shaped that the following tool does not begin to cut until it has reached the locality with relation to the point of the blank at which the advance tool began to cut.

10. A screw machine having a plurality of threading tools arranged side by side fractions of full pitch apart on the same side of the blank to be threaded, cams for feeding the tools longitudinally of the blank and toward the axis of the blank, said cams being so shaped and related that the following tool does not begin to cut until it has reached the locality longitudinally with relation to the point of the blank at which the advance tool began to cut.

11. A screw machine having a plurality of threading tools arranged side by side fractions of full pitch apart on the same side of the blank to be threaded, a common feeding means, and means for moving the tools toward the blank, said latter means being so formed that the following tool does not begin to cut until it has reached the locality with relation to the point of the blank at which the advance tool began to cut.

12. A screw machine having a plurality of threading tools arranged side by side fractions of full pitch apart on the same side of the blank to be threaded, and common mechanism for swinging the tools transversely of the blank independently of each other said mechanism including a cam which swings the advance tool to the blank and causes it to cut before the following tool is permitted to cut.

13. A screw machine having a plurality of threading tools arranged side by side fractions of full pitch apart on the same side of the blank to be threaded, and mechanism for swinging the tools transversely of the blank independently of each other and unequal distances, said mechanism presenting the advance tool to the blank before the following tool is presented to the blank.

14. A screw machine having a plurality of threading tools arranged side by side fractions of full pitch apart on the same side of the blank to be threaded, common means for feeding the cutting tools together, longitudinally along and beyond the point of the blank, equal distances, common means for swinging the tools transversely of the blank independently of each other unequal distances, and presenting the advance tool to the blank before the following tool is presented to the blank.

15. A screw machine having a plurality of threading tools arranged side by side and mounted fractions of full pitch apart on concentric shafts, said shafts having independent oscillatory movements but a common longitudinal movement, a cam for feeding the shafts together longitudinally and a cam for oscillating the shafts, said latter cam being cut to oscillate one shaft more than the other shaft, and present the advance tool to the blank to be threaded before the following tool is presented to the blank.

16. A screw machine having a plurality of threading tools arranged side by side and mounted fractions of full pitch apart on concentric shafts, said shafts having independent oscillatory movements but a common longitudinal movement, a cam for feeding the shafts together longitudinally, a profile cam for controlling the oscillatory movements of the shafts, and a cut cam for controlling the position of the profile cam, said profile cam being shaped to present the advance tool to the blank to be threaded before the following tool is presented to the blank.

17. A screw machine having a plurality of threading tools arranged side by side and mounted fractions of full pitch apart on concentric shafts, said shafts having independent oscillatory movements but a common longitudinal movement, a cam for feeding the shafts together longitudinally, and a profile cam for controlling the oscillatory movements of the shafts, said profile cam being cut away so that the following tool is not presented to the blank to be threaded until after the advance tool has begun to cut the blank.

18. A screw machine having a plurality of threading tools arranged side by side and mounted fractions of full pitch apart on concentric shafts, said shafts having independent oscillatory movements but a common longitudinal movement, means for feeding the shafts together longitudinally, and a profile cam shaped to oscillate one of said shafts and present one tool to a blank before the other.

HENRY L. SMITH.